(12) United States Patent
Urakawa et al.

(10) Patent No.: US 8,190,138 B2
(45) Date of Patent: May 29, 2012

(54) MOBILE COMMUNICATION TERMINAL TO IDENTIFY AND REPORT UNDESIRABLE CONTENT

(75) Inventors: Yasutaka Urakawa, Yokohama (JP); Masanori Fujita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1294 days.

(21) Appl. No.: 11/036,677

(22) Filed: Jan. 14, 2005

(65) Prior Publication Data

US 2005/0159145 A1  Jul. 21, 2005

(30) Foreign Application Priority Data

Jan. 15, 2004  (JP) ................................. 2004-008531

(51) Int. Cl.
*H04M 3/00* (2006.01)

(52) U.S. Cl. ..................... 455/418; 455/412.1; 455/406; 455/407; 455/408; 455/466

(58) Field of Classification Search .................. 455/418, 455/412.1, 466; 709/224, 207, 237; 707/1; 726/4
See application file for complete search history.

(56) References Cited

U.S. PATENT DOCUMENTS

| | | | | |
|---|---|---|---|---|
| 5,430,439 A * | 7/1995 | Bodet et al. | .................. | 340/7.52 |
| 5,675,324 A * | 10/1997 | Hashimoto et al. | .......... | 340/7.52 |
| 5,729,209 A * | 3/1998 | Motohashi | .................. | 340/7.52 |
| 5,918,165 A * | 6/1999 | Takatsuka | .................. | 455/186.1 |
| 5,970,492 A * | 10/1999 | Nielsen | ............................ | 707/10 |
| 6,052,709 A * | 4/2000 | Paul | .............................. | 709/202 |
| 6,167,266 A * | 12/2000 | Havinis et al. | ................. | 455/433 |
| 6,289,464 B1 * | 9/2001 | Wecker et al. | ................. | 713/300 |
| 6,317,668 B1 * | 11/2001 | Thibault | .......................... | 701/35 |
| 6,343,311 B1 | 1/2002 | Nishida et al. | | |
| 6,411,709 B1 * | 6/2002 | Lucey | ............................ | 379/430 |
| 6,442,589 B1 * | 8/2002 | Takahashi et al. | ............ | 709/203 |
| 6,456,936 B1 | 9/2002 | Neukirchen et al. | .......... | 701/213 |
| 6,477,529 B1 * | 11/2002 | Mousseau et al. | ................. | 707/5 |
| 6,546,416 B1 * | 4/2003 | Kirsch | ........................... | 709/206 |
| 6,587,033 B1 * | 7/2003 | Morishima | .................. | 340/7.55 |
| 6,615,242 B1 * | 9/2003 | Riemers | ........................ | 709/206 |
| 6,628,965 B1 * | 9/2003 | LaRosa et al. | ................. | 455/557 |
| 6,650,890 B1 * | 11/2003 | Irlam et al. | .................. | 455/412.1 |
| 6,662,313 B1 * | 12/2003 | Swanson et al. | ................. | 714/39 |
| 6,742,038 B2 * | 5/2004 | Britt, Jr. | ......................... | 709/228 |

(Continued)

FOREIGN PATENT DOCUMENTS

CN  1427642 A  7/2003

(Continued)

OTHER PUBLICATIONS

Taiwanese Office Action dated Jan. 18, 2008.

(Continued)

*Primary Examiner* — Steven Lim
*Assistant Examiner* — Diego Herrera
(74) *Attorney, Agent, or Firm* — Brinks Hofer Gilson & Lione

(57) ABSTRACT

Mobile phone 300 is registered with various types of specific keywords. When receiving an e-mail from an external terminal, mobile phone 300 determines whether the e-mail contains a specific keyword. When it is determined that the e-mail contains the specific keyword, mobile phone 300 generates log data containing the specific keyword. Mobile phone 300 then transmits the generated log data to a predetermined transmission destination (such as communication management server 700).

16 Claims, 11 Drawing Sheets

U.S. PATENT DOCUMENTS

| | | | |
|---|---|---|---|
| 6,938,065 B2 * | 8/2005 | Jain | 709/201 |
| 6,941,467 B2 * | 9/2005 | Judge et al. | 726/22 |
| 6,952,719 B1 * | 10/2005 | Harris | 709/206 |
| 7,031,733 B2 | 4/2006 | Alminana et al. | 455/466 |
| 7,051,085 B1 * | 5/2006 | Lee | 709/219 |
| 7,133,660 B2 | 11/2006 | Irlam et al. | 455/403 |
| 7,181,764 B2 * | 2/2007 | Zhu et al. | 726/4 |
| 7,219,148 B2 * | 5/2007 | Rounthwaite et al. | 709/224 |
| 7,228,472 B2 | 6/2007 | Johnson et al. | 714/724 |
| 7,249,182 B1 | 7/2007 | Heinonen et al. | 709/227 |
| 7,348,799 B2 | 3/2008 | Benavides et al. | 326/46 |
| 7,525,975 B2 * | 4/2009 | Caspi et al. | 370/401 |
| 7,702,315 B2 | 4/2010 | Engstrom et al. | 455/412.1 |
| 2002/0049826 A1 * | 4/2002 | Ariga | 709/216 |
| 2002/0073159 A1 * | 6/2002 | Jain | 709/206 |
| 2002/0078155 A1 * | 6/2002 | Lai et al. | 709/206 |
| 2002/0086661 A1 * | 7/2002 | Rouse et al. | 455/412 |
| 2002/0107925 A1 * | 8/2002 | Goldschneider et al. | 709/206 |
| 2002/0120600 A1 * | 8/2002 | Schiavone et al. | 707/1 |
| 2002/0143885 A1 * | 10/2002 | Ross, Jr. | 709/207 |
| 2002/0160805 A1 * | 10/2002 | Laitinen et al. | 455/550 |
| 2003/0009698 A1 * | 1/2003 | Lindeman et al. | 713/201 |
| 2003/0083108 A1 * | 5/2003 | King et al. | 455/566 |
| 2003/0087630 A1 * | 5/2003 | Wakabayashi | 455/412 |
| 2003/0163537 A1 * | 8/2003 | Rohall et al. | 709/206 |
| 2003/0182383 A1 * | 9/2003 | He | 709/206 |
| 2003/0229672 A1 * | 12/2003 | Kohn | 709/207 |
| 2003/0231207 A1 * | 12/2003 | Huang | 345/752 |
| 2004/0006747 A1 * | 1/2004 | Tyler | 715/530 |
| 2004/0110497 A1 * | 6/2004 | Little | 455/418 |
| 2004/0137884 A1 * | 7/2004 | Engstrom et al. | 455/414.1 |
| 2004/0185877 A1 * | 9/2004 | Asthana et al. | 455/456.6 |
| 2004/0203615 A1 * | 10/2004 | Qu et al. | 455/412.1 |
| 2005/0085232 A1 * | 4/2005 | Laitinen et al. | 455/445 |
| 2005/0266837 A1 * | 12/2005 | Lim | 455/418 |
| 2009/0106380 A1 * | 4/2009 | Asthana et al. | 709/206 |

FOREIGN PATENT DOCUMENTS

| | | |
|---|---|---|
| EP | 0 881 587 A2 | 2/1998 |
| EP | 1150130 A2 * | 10/2001 |
| FI | WO02/69585 A2 * | 6/2002 |
| GB | 2 370 379 | 6/2002 |
| JP | 10-334004 | 12/1998 |
| JP | 10-334065 | 12/1998 |
| JP | H11-289404 A | 10/1999 |
| JP | 2003-163958 | 6/2003 |
| JP | 2003-216549 | 7/2003 |
| JP | 2006251929 A * | 9/2006 |
| JP | 2006309615 A * | 11/2006 |
| KR | 2003-0048201 | 6/2003 |
| TW | 535386 B | 6/2003 |
| WO | WO 92/15971 A1 | 9/1992 |
| WO | WO02069585 A2 | 9/2002 |

OTHER PUBLICATIONS

Korean Office Action dated Jul. 31, 2006 and the translation.
Japanese Office Action dated Nov. 11, 2008, from Japanese Patent Application No. 2004-008531, with full translation (6 pgs).
European Office Action issued in European Patent Application No. 05000429.0, dated Mar. 10, 2011, 4 pages.
Office Action dated Jun. 3, 2008, from Taiwanese Patent Application No. 94100862.

* cited by examiner

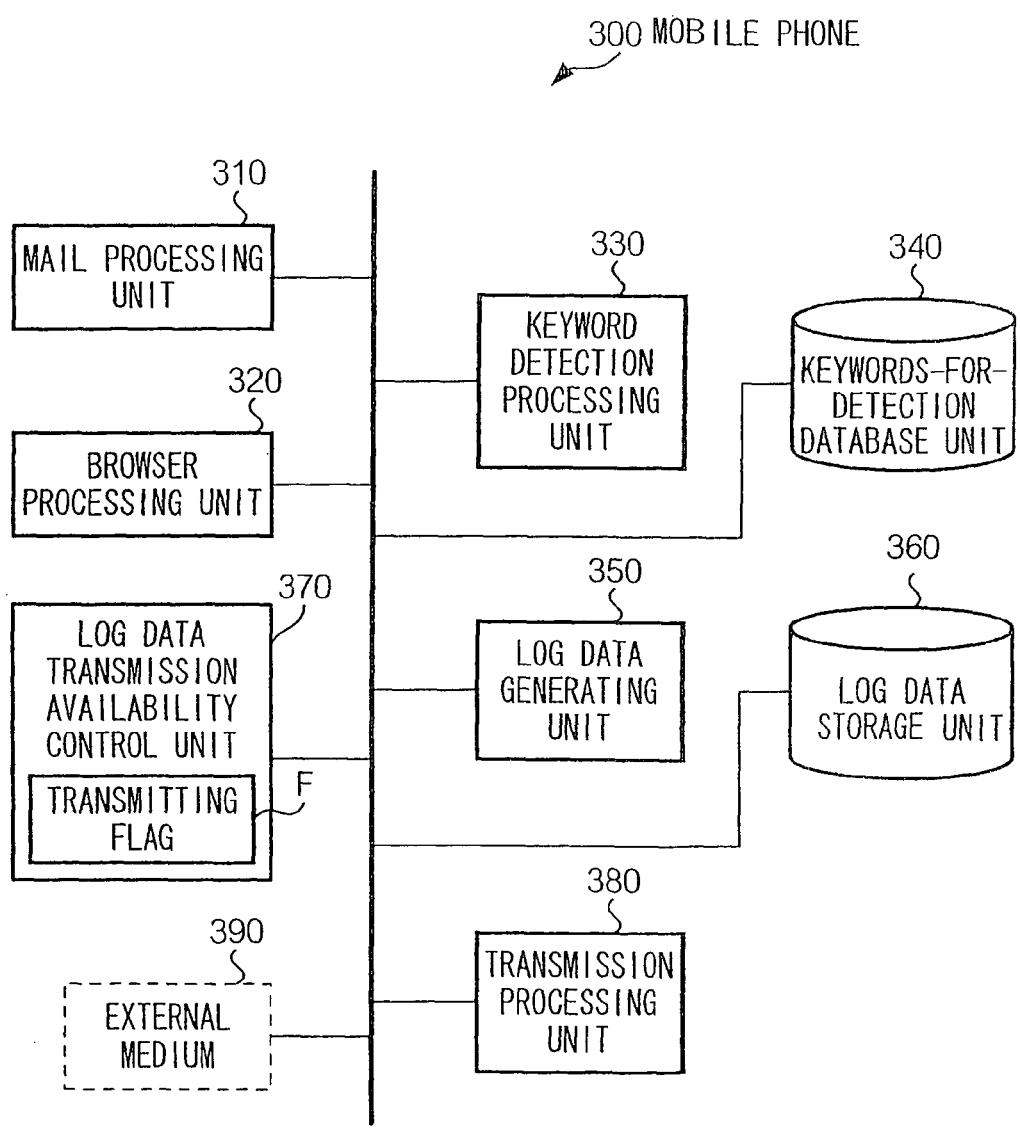

<SPECIFIC KEYWORD>

| CHARACTER STRING (e.g. WORD) | 「PATRONAGE DATING」 |
| | 「RUNAWAY」 |
| | 「HATE」 |
| | 「DATING SERVICE」 |
| | ⋮ |
| DIGIT SEQUENCE (e.g. TELEPHONE NUMBER) | 「090-32○×···」 |
| | 「03-3○×···」 |
| | 「045-68×○···」 |
| | ⋮ |
| SYMBOLIC SEQUENCE (e.g. URL) | 「http://www.abc.···」 |
| | 「http://www.aaa.···」 |
| | ⋮ |

MOBILE COMMUNICATION TERMINAL TO IDENTIFY AND REPORT UNDESIRABLE CONTENT

This application claims priority under 35 U.S.C. §119 to Japanese Patent Application No. 2004-008531 filed Jan. 15, 2004, the entire content of which is hereby incorporated by reference.

TECHNICAL FIELD

The present invention relates to an accounting control device for controlling a mobile communication terminal and an account charged for data to be transmitted from the mobile communication terminal.

In recent years, the increase in the use of mobile communication terminals which also have mail functions, such as a mobile phone or a PHS (Personal Handyphone System: trademark) has enabled users of the terminals to carry out communication without any restrictions of time or place and with any desired party. The users of mobile communication terminals include a high school student, a junior-high school student, and school children even as young as an elementary school student. In such cases, the guardian of a child using a mobile communication terminal is concerned about the excessive use of the terminal.

To prevent a mobile communication terminal from being used excessively, a technique is disclosed in Japanese Patent Application Laid-Open Publication No. H11-289404 (column 5); wherein, when data communication fees for a predetermined period of time exceeds a limited value set in advance, any further data communication is prohibited (hereinafter the document will be referred to as patent document 1).

SUMMARY OF THE INVENTION

The technique laid out in patent document 1, when applied to a mobile communication terminal, prevents overuse of a mobile communication terminal by a user. However, the guardian of a child using the mobile communication terminal may be more concerned about the party with whom the child communicates and the content of the communication.

For example, there may be a case of a person sending to his/her associates an e-mail intimating a crime or an e-mail communicating that he/she is involved in a crime; however, if the associate does not take notice of the e-mail promptly, a serious accident is likely to occur.

Furthermore, in recent years social problems relating to communication using mobile communication terminals include the transmission of e-mails for commercial purposes, (in other words, unwanted e-mail) to a user without the consent of the user of the above described mobile communication terminal. As for unwanted e-mails, although the users of the terminals can take various measures to prevent unwanted e-mails being sent to their terminals, such as regularly changing the address of character strings as opposed to changing a telephone number, it is still difficult to completely prevent the receipt of unwanted e-mails. To provide more effective measures, the users of mobile terminals are required to regularly collect the unwanted e-mails, but the current situation is that no such collection is performed. It is possible to collect unwanted e-mails by designating the URLs of a carrier server (a server that a carrier uses to manage communication) by a carrier for each unwanted e-mail received by a user and transmitting the e-mails to the carrier server. To realize the technique, however, each user is required to perform operations that are excessively complicated (such as inputting the URL of a carrier server).

The problem is compounded by the fact that a user, as in the case of sending and receiving e-mails from friends, is charged for the transmission of all e-mails, including unwanted e-mails.

The present invention has been presented under the above-explained problems; and an aim of it is to provide a mobile communication terminal that is able to suitably and promptly notifying a user of a mobile communication terminal of the identity of the communication party and the contents of communication.

Another aim of the present invention is to provide a mobile communication terminal that is capable of transmitting unwanted e-mails to a predetermined node without imposing a complicated operation on a user.

To solve the stated problems, a mobile communication terminal of the present invention is characterized by comprising keyword storage means for storing a specific keyword; determination means for determining, when performing data communication with an external terminal, whether data received from the external terminal or data transmitted to the external terminal contain the specific keyword; generating means for generating log data containing the specific keyword in a case that the received data or the transmitted data contain the specific keyword; and storage means for storing log data generated by the generating means.

The configuration enables the generating of log data including a specific keyword and storing the data in a mobile communication terminal, in a case that a specific keyword (such as "patronage dating") is included in data sent and received by a mobile communication terminal. By reading the log data at a predetermined timing, it is possible to know suitably and promptly the identity of the communication party and the contents of communication.

In the above configuration, a preferred mobile communication terminal may further comprise transmission means for transmitting the log data to a predetermined specific node.

A mobile communication terminal of the present invention is characterized by further comprising condition storage means for storing the generating condition of log data; determination means for determining whether to generate log data of either data received from an external terminal or data transmitted to the external terminal when performing data communication with the external terminal; generating means for generating the log data when the log data is determined to be generated; and storage means for storing log data generated by the storage means; and transmission means for transmitting the log data to a predetermined specific node when receiving from an external terminal a transmission instruction of the log data.

In another preferred embodiment, the transmission means may transmit the log data to a specific node, when the amount of the log data reaches a predetermined threshold value, or the transmission means may transmit the log data to a specific node, when the storage capacity of the log data reaches a predetermined threshold value.

As explained above, the present invention has been developed so as to, under a predetermined condition, suitably and promptly notifying the identity of the communication party and the contents of communication carried out by a user of a mobile communication terminal.

BRIEF DESCRIPTION OF THE DRAWINGS

FIG. 2 is a diagram showing the functional configuration of a mobile phone of the first embodiment.

PREFERRED EMBODIMENTS

Referring now to the figures, an explanation with regard to the embodiments of the present invention will now be given.

A. First Embodiment (1) Configuration of Embodiment

Figure 1:
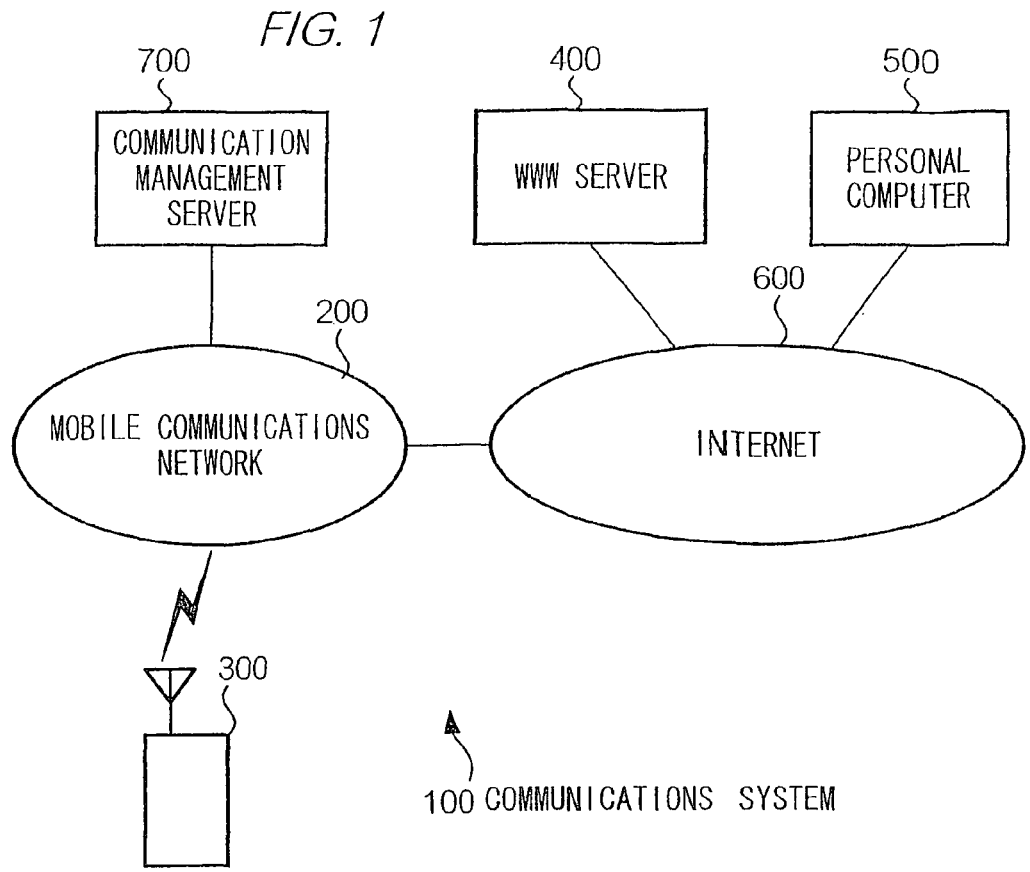
FIG. 1 is a diagram showing the structure of a communication system of a first embodiment.

FIG. 1 is a diagram showing the structure of communication system 100 of a first embodiment. Communication system 100 comprises a mobile communication network 200 and Internet 600; mobile communication network 200 and Internet 600 are connected via a gateway server device (not shown). The data relay function of the gateway server device allows bi-directional data communication between mobile communication network 200 and Internet 600. It should be noted that in FIG. 1, to prevent the figures from becoming complicated, one mobile phone 300, one WWW server 400, and one personal computer 500 are shown; in actuality however, many more of them exist.

Mobile phone (mobile communication terminal) 300 accommodated in mobile communication network 200 includes cellular phones, PHS, and PDA (Personal Digital Assistance) having a mail function or an Internet accessing function. Mobile phone 300 downloads content from WWW server 400 connected to Internet 600 or sends/receives e-mails to/from personal computer 500 connected to Internet 600. Mobile phone 300 is also provided with a means for generating and storing log data representing the history of data communication; the function will be described later. In the following description, for the sake of explanation, WWW server 400 and personal computer 500 performing data communication with mobile phone 300 will generically be referred to as external terminals. An external terminal includes not only a terminal that performs a peer-to-peer connection with mobile phone 300, but also a content server of a provider or a mail server for delivering e-mails. A communication management server (specific node) 700 accommodated in mobile communication network 200 manages log data sent from mobile phone 300.

FIG. 2 is a diagram showing the functional configuration of mobile phone 300.

Mobile phone 300 is provided with hardware resources such as an input device, including a CPU, a memory, a communication device, and an operating button, and a display device including LCD; the hardware resources cooperate with the software stored in a memory to provide the following functions.

Mail processing unit 310 controls sending/receiving of e-mails. Mail processing unit 310 provides to keyword detection processing unit 330 as search object data, e-mails received from external terminals or e-mails to be sent to external terminals.

Browser processing unit 320 controls the downloading of content or the display of downloaded content. When receiving content (content written in HTML, for example) from WWW server 400, browser processing unit 320 provides the content as search object data to keyword detection processing unit 330 before displaying the content.

Figures 3, 4:
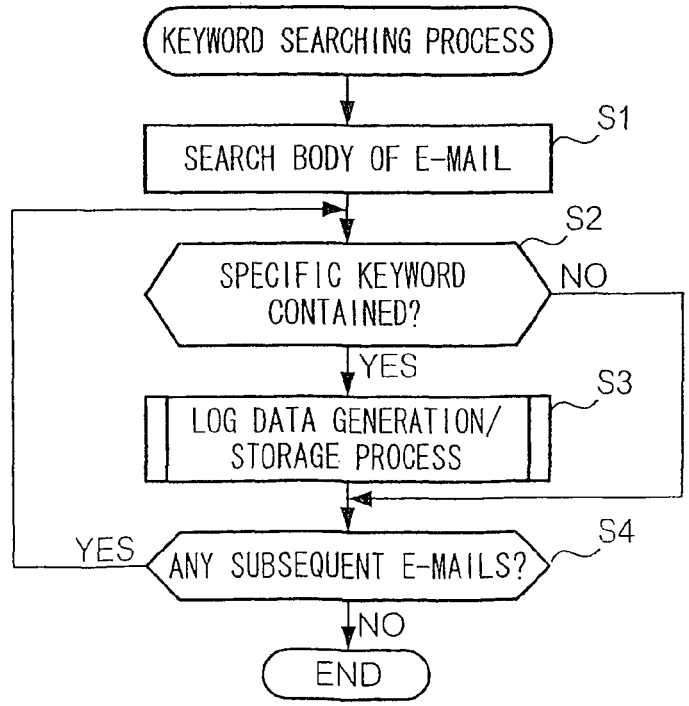
FIG. 3 is a diagram illustrating a specific keyword of the first embodiment.
FIG. 4 is a flowchart showing the keyword detecting processes of the first embodiment.

Keyword detection processing unit 330 determines whether the search object data provided by mail processing unit 310 or browser processing unit 320 contains a specific keyword data. FIG. 3 is a diagram illustrating the specific keywords registered with keywords-for-detection database unit 340.

Keywords-for-detection database unit (keyword storage means) 340 is registered with various types of specific keywords. The specific keywords are used for determining the necessity of the later described log data, and the keywords include character strings such as "patronage dating", "runaway", and "hate" or digit sequences such as "090-32X . . . ", and symbolic sequences such as "www.abc . . . " It is possible to delete, update, and add various keywords registered with keywords-for-detection database unit 340 by operation on mobile phone 300 from a user or instructions from a server (not shown). Specific keywords are not limited to character strings containing one keyword (such as "patronage dating"); the keywords may include character strings in combination with several keywords, such as "patronage dating", "high school student", and "girl".

When receiving search object data from either mail processing unit 310 or browser processing unit 320, keyword detection processing unit 330 refers to keywords-for-detection database unit 340 and determines whether a specific keyword is included in the search object data. Keyword detection processing unit 330 returns the determination result to mail processing unit 310 or browser processing unit 320. In a case that a specific keyword is determined to be included in the search object data, keyword detection processing unit 330 gives an instruction for generating log data to log data generating unit 350.

In accordance with an instruction for generating log data, log data generating unit (generating means) 350 generates log data containing the specific keyword detected in keyword detection processing unit 330. More specifically, in a case that the specific keyword "patronage dating" is included in search object data, keyword detection processing unit 330 generates log data of one clause containing the specific keyword "patronage dating". Log data contains at least the above described specific keyword; thus, the whole subject data containing the above described specific keyword (namely, full text) may be generated as log data, or the log data containing the above described specific keyword and address information indicating the sending source or the transmission destination may also be generated. Furthermore, log data containing the above described specific keyword as well as the communicating time information indicating either a sending time or a receiving time may also be generated. In a case that several specific keywords (such as "patronage dating", "runaway") are included in search object data, log data containing any one specific keyword or all of the specific keywords may be generated.

Log data storage unit (storage means) 360 stores and manages log data generated by log data generating unit 350. The methods for storing log data include a method for storing log data on the basis of a keyword included in the data, or a method for storing log data in the order of its generated time; however, the method for storing log data is set arbitrarily. In a case that the capacity of log data storage unit 360 is full, the additional storage of log data may be stopped, or the latest log data may be stored by deleting old log data; however, in other embodiments, the log data may be handled in other ways or arbitrarily.

Log data transmission availability control unit 370 is means for controlling the permission and prohibition of transmitting the above described log data, and the unit has a transmission flag (permission; ON, prohibition; OFF). Since the switching timing of a transmission flag F (namely, the switching timing between transmission permission and transmission prohibition of log data) will be described later, explanation of it will be omitted.

Transmission processing unit (transmission means) 380 performs a transmission process of log data on the basis of transmission flag F changed by transmission availability control unit 370. Transmission point of log data (in the present embodiment, the point is communication management server 700) is set in transmission processing unit 380. The transmission point of log data may be changed arbitrarily through an operation of mobile phone 300 carried out by a user; in another embodiment, a transmission point may also be set and changed by a server (not shown).

The detailed configuration of communication system 100 according to the first embodiment has been given. An explanation with respect to the operations of communication system 100 will next be illustrated; wherein, mobile phone 300 sends and receives e-mails between external terminals.

(2) Operations of Embodiments

<Keyword Detecting Process>

FIG. 4 is a flowchart showing the keyword detecting processes performed by mobile phone 300.

Mail processing unit 310 provides to keyword detection processing unit 330 e-mails received from personal computer 500, or e-mails to be transmitted to personal computer 500 as search object data. When receiving an e-mail from mail processing unit 310, keyword detection processing unit 330 refers to keywords-for-detection database unit 340 and determines whether a specific keyword is included in the e-mail (from step S1 to step S2). In a case that it is determined that an e-mail contains a specific keyword (step S2; Yes), keyword detection processing unit 330 transmits to mail processing unit 310 a determination result that the e-mail contains a specific keyword and gives an instruction for generating log data to log data generating unit 350. In accordance with an instruction for generating log data, log data generating unit 350 generates log data and stores the log data (step S3).

In a case that it is determined that an e-mail does not contain a specific keyword (step S2; No), keyword detection processing unit 330 transmits to mail processing unit 310 a determination result that the e-mail does not contain a specific keyword. When a determination result is received from keyword detection processing unit 330, mail processing unit 310 determines the existence of subsequent e-mails which is a searching object (step S4). In a case it is determined that subsequent e-mails exist, mail processing unit 310 returns to step S2 to repeat the above processes; in a case it is determined that subsequent e-mails do not exist, the mail processing unit terminates the above explained keyword detecting processes.

<Log data Generating/Storing Process>

Figure 5:
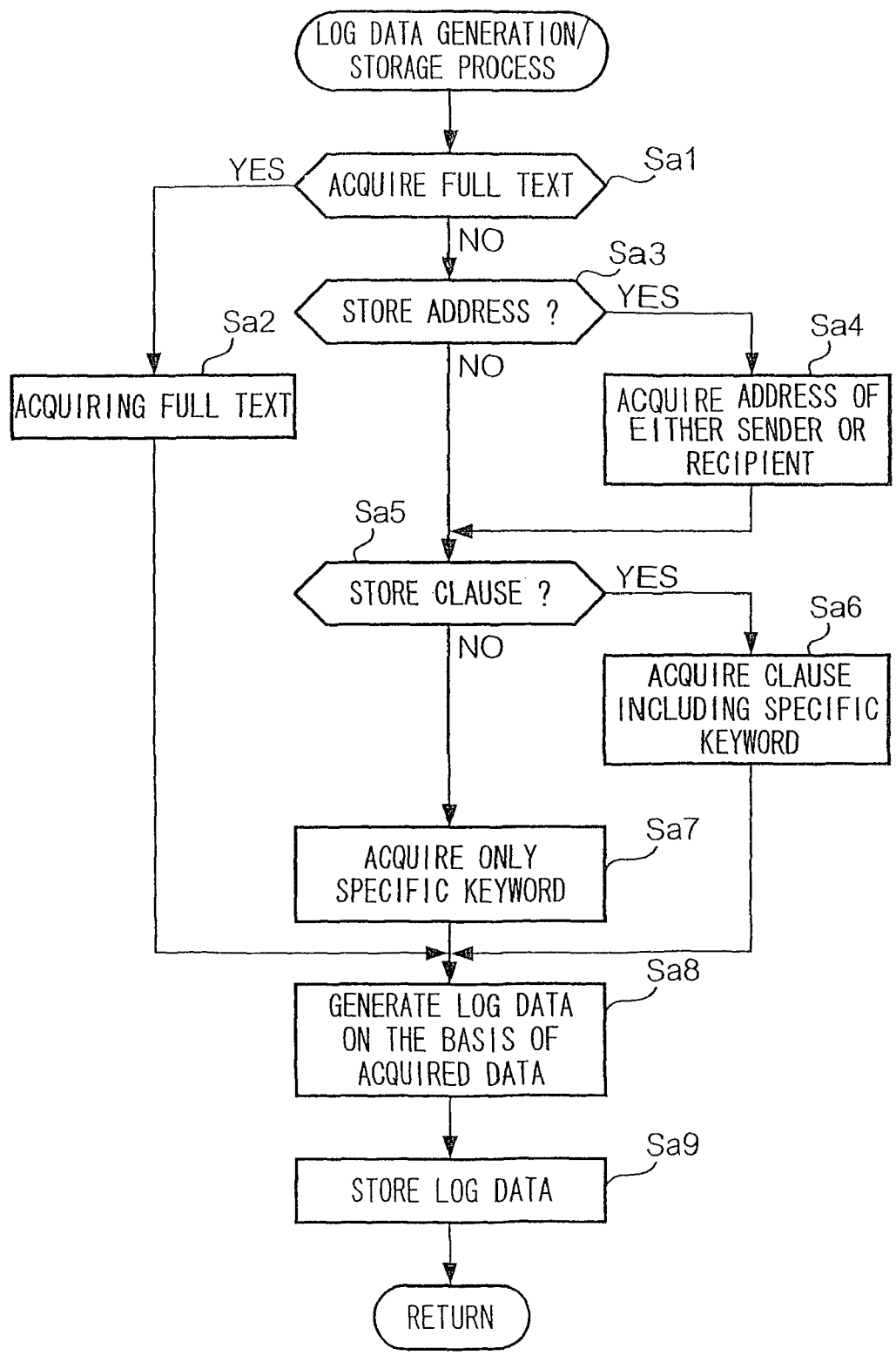
FIG. 5 is a flowchart showing the log data generating/storing processes of the first embodiment.

FIG. 5 is a flowchart showing the log data generating/storing processes (refer to step S3) performed by mobile phone 300.

Log data generating unit 350 determines whether to store a whole e-mail (storing full text) containing a specific keyword (step Sa1). Whether to store the full text may be determined on the basis of the type of specific keyword included in the e-mail, or the detection time of a specific keyword. In a case it is determined that the full text is to be stored, log data generating unit 350 proceeds to step Sa2 to acquire the full text of the e-mail containing the specific keyword. Log data generating unit 350 then generates the acquired full text of the e-mail as log data (from step Sa2 to step Sa8). In a case it is determined that the full text is not to be stored, log data generating unit 350 proceeds to step Sa3 to determine whether to store the addresses (address storage) of either a sender or a recipient of the e-mail. In a case it is determined that the address is to be stored, log data generating unit 350 proceeds to step Sa4 to acquire the address of either a sender or a recipient included in the e-mail, and proceeds to step Sa5. In a case it is determined that the address is not to be stored, log data generating unit 350 proceeds to step Sa5.

When proceeding to step Sa5, log data generating unit 350 determines whether to store a clause containing a specific keyword (clause storage). In the clause storage, one clause containing a specific keyword may be stored; in another embodiment, a plurality of clauses (five clauses, for example) containing a specific keyword may also be stored. In a case it is determined that the clause is to be stored, log data generating unit 350 proceeds to step Sa6 to acquire a clause containing a specific keyword. Log data generating unit 350 then generates the acquired clause as log data (from step Sa6 to step Sa8). In a case that an address is acquired in step Sa4, log data generating unit 350 adds the address to the clause and generates the log data. In a case it is determined that the clause is not to be stored, log data generating unit 350 proceeds to step Sa7.

In step Sa7, log data generating unit 350 simply acquires a specific keyword. Then, log data generating unit 350 generates the acquired specific keyword as log data (from step Sa7 to step Sa8). In a case that an address is acquired in step Sa4, log data generating unit 350 adds the address to the specific keyword and generates the log data. As a result of generating log data, log data generating unit 350 provides the data to log data storage unit 360. Log data storage unit 360 stores and manages log data provided by log data generating unit 350 (step Sa9). Since the details of storing log data are described in the explanation of configuration of embodiments, the explanation of a storing method is omitted.

An explanation has been given with regard to the case, wherein mobile phone 300 sends and receives e-mails between external terminals; almost the same explanation is given with respect to a case, wherein mobile phone 300 downloads content such as HTML from external terminals. Specifically, in the former case, e-mails received by mail processing unit 310 are provided as search object data to keyword detection processing unit 330; in the latter case, content downloaded by browser processing unit 320 is provided as search object data to keyword detection processing unit 330. Except with regard to the above mentioned-point, the essential configurations of the two cases are almost the same; therefore, further explanation will be omitted.

In the above example, WWW server 400, personal computer 500 are illustrated as external terminals; in other embodiments, external medium 390 attachable to mobile phone 300 (refer to dotted line in FIG. 2) is also employed as an external terminal. External medium 390 is formed by a storage medium capable of data communication with mobile phone 300 (such as a memory stick or an IC card). In this configuration, every type of data stored in a storage medium may be transmitted in sequence as search object data to keyword detection processing unit 330. With reference to other points, almost the same explanation as that of log data generating/storing process is given in the present embodiment; therefore, further explanation will be omitted.

<Transmission Availability Controlling Process>

Figure 6:
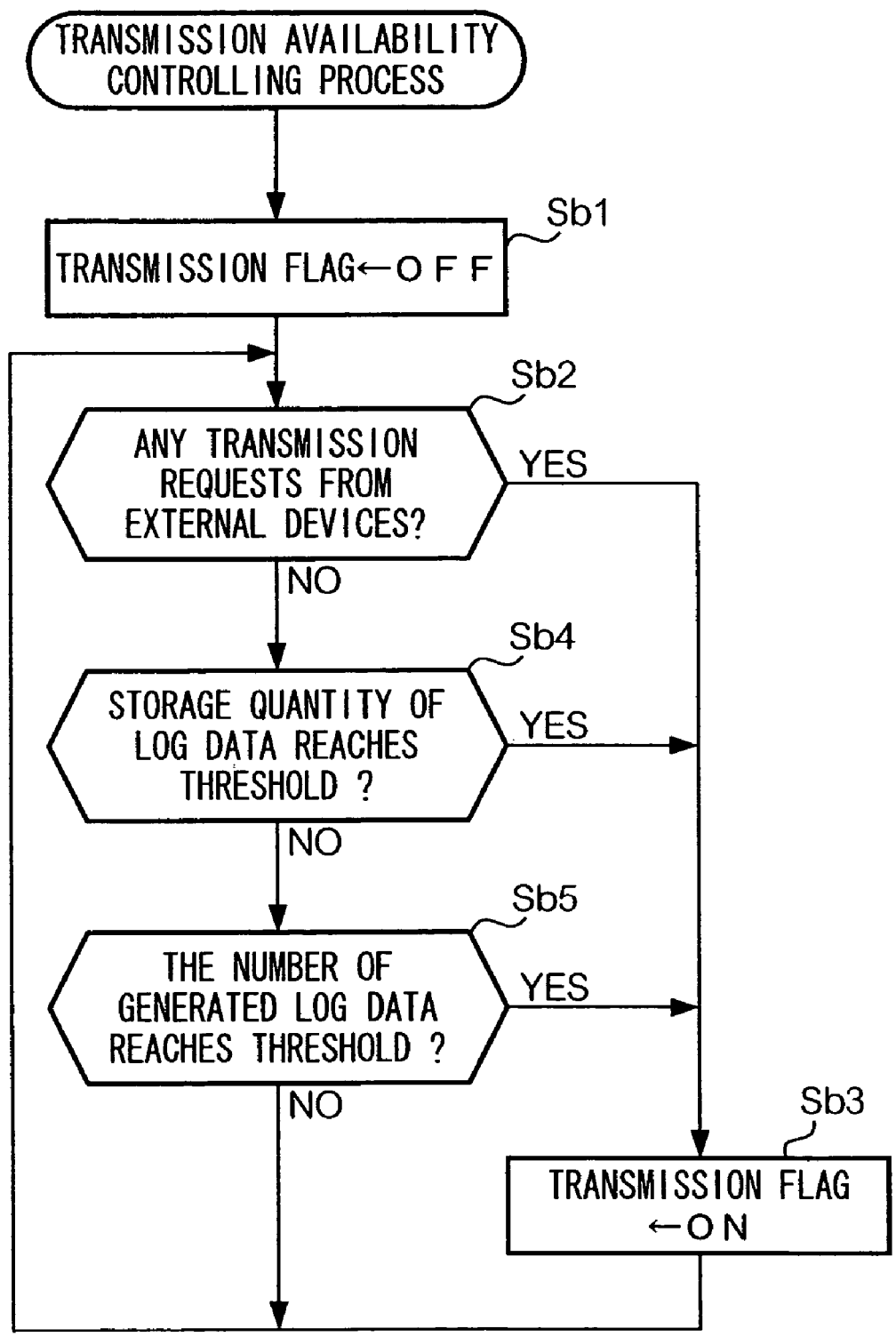
FIG. 6 is a flowchart showing the transmission availability controlling processes of the first embodiment.

FIG. 6 is a flowchart showing the transmission availability controlling processes performed by mobile phone 300.

In the state that transmission flag F is set to "OFF", log data transmission availability control unit 370 determines whether it has received a transmission request of log data from external devices (from step Sb1 to step Sb2). Note that the external devices refer to a node excluding mobile phone 300; the node includes various types of nodes connected to units such as either communication management server 700 or Internet 600. In a case it is determined that a transmission request of log data is received from external devices (step Sb2; Yes), log data transmission availability control unit 370 switches transmission flag F from "OFF" to "ON", thereby permitting the transmission of the log data (step Sb3).

In a case it is determined that a transmission request of log data is not received from external devices (step Sb2; No), the process proceeds to step Sb4 and log data transmission availability control unit 370 determines whether the storage capacity of log data storage unit 360 has reached a predetermined threshold (such as a maximum upper limit that can be stored in log data storage unit 360). The threshold may be set at a predetermined value when marketing mobile phone 300, for example; the threshold may also be set and changed in accordance with an instruction given by an external device. The same concept is applied to the threshold described below.

When determining that storage capacity of log data storage unit 360 has reached a predetermined threshold (step Sb4; Yes), log data transmission availability control unit 370 switches transmission flag F from "OFF" to "ON", thereby permitting the transmission of log data (step Sb3) and resets the status (not shown) indicating that the storage capacity of log data has reached a predetermined threshold.

When determining that the storage capacity of log data storage unit 360 has not reached a predetermined threshold (step Sb4; No), the process proceeds to step Sb5 and log data transmission availability control unit 370 determines whether the amount of generated log data has reached a predetermined threshold (for example, 10 log data). In the case it is determined that the amount of generated log data has reached a predetermined threshold (step Sb5; Yes), log data transmission availability control unit 370 switches transmission flag F from "OFF" to "ON", thereby permitting the transmission of log data (step Sb3) and resets the value of a counter used for counting the log data.

Three patterns of switching timing of a transmission flag from "OFF" to "ON" have been illustrated. The switching timing of a transmission flag from "OFF" to "ON"; namely, the timing for permitting log data can be set or changed depending on the design of mobile phone 300. Furthermore, the resetting timing for the above described status or the resetting timing for the value of the above-described counter can be arbitrarily set and changed.

<Transmission Process>

Figure 7:
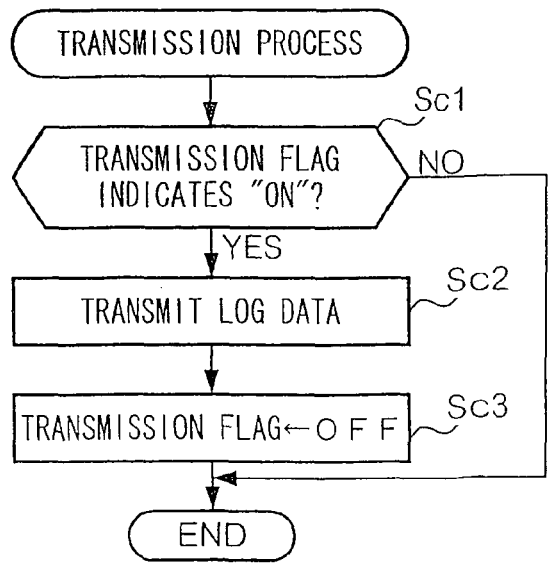
FIG. 7 is a flowchart showing the transmission processes of the first embodiment.

FIG. 7 is a flowchart showing the transmission processes performed by mobile phone 300.

Transmission processing unit 380 detects whether a transmission flag F is "ON" (step Sc1). When detecting that a transmission flag is switched to "ON", transmission processing unit 380 transmits log data stored in log data storage unit 360 to a predetermined transmission destination of log data (in the present embodiment, the destination is communication management server 700). When the transmission of log data is completed, transmission processing unit 380 switches the transmission flag F from "ON" to "OFF" (step Sc3) and ends the processes. It should be noted that, all log data stored at the point of transmission may be transmitted to a transmission destination; in another preferred embodiment, however, some of the log data stored by the point of transmission (for example, only the most recent log data) may also be transmitted. As such, the type or the amount of log data to be transmitted may be limited.

As explained, in the above-described configuration, log data containing a specific keyword considered offensive to public order and morals, such as "patronage dating" is transmitted to a predetermined transmission destination, (such as communication management server 700). In this way, it is possible to preserve the records of the distributed unwanted e-mails containing the above-described specific keyword. In a case that a part of search object data (such as, only a specific keyword) is generated as log data, the communication traffic is reduced compared to a case where the full text of search object data is generated as log data.

(3) Modification Examples

Modification Example 1

In the foregoing explanation, the generated log data is temporarily stored in log data storage unit 360 to be transmitted to a predetermined transmission destination; in another embodiment, however, the generated log data may directly be transmitted to a predetermined transmission destination without being stored in log data storage unit 360. More specifically, when generating log data, log data generating unit 350 provides the log data directly to transmission processing unit 380. When receiving log data from log data generating unit 350, transmission processing unit 380 transmits log data to a predetermined transmission destination (such as communication management server 700).

The present embodiment can be realized by a mobile communication terminal comprising: keyword storage means storing specific keywords; determination means, when data communication is performed with external terminals for determining whether incoming data from the external terminals or the outgoing data to the external terminals contain the above described specific keyword; generating means, in a case that the above described specific keyword is contained in either the above described incoming data (hereinafter, received data) or the above described outgoing data (hereinafter, transmitted data), for generating the above described log data containing the specific keyword; and transmission means for transmission the above described log data to a predetermined specific node.

Modification Example 2

Figure 8:
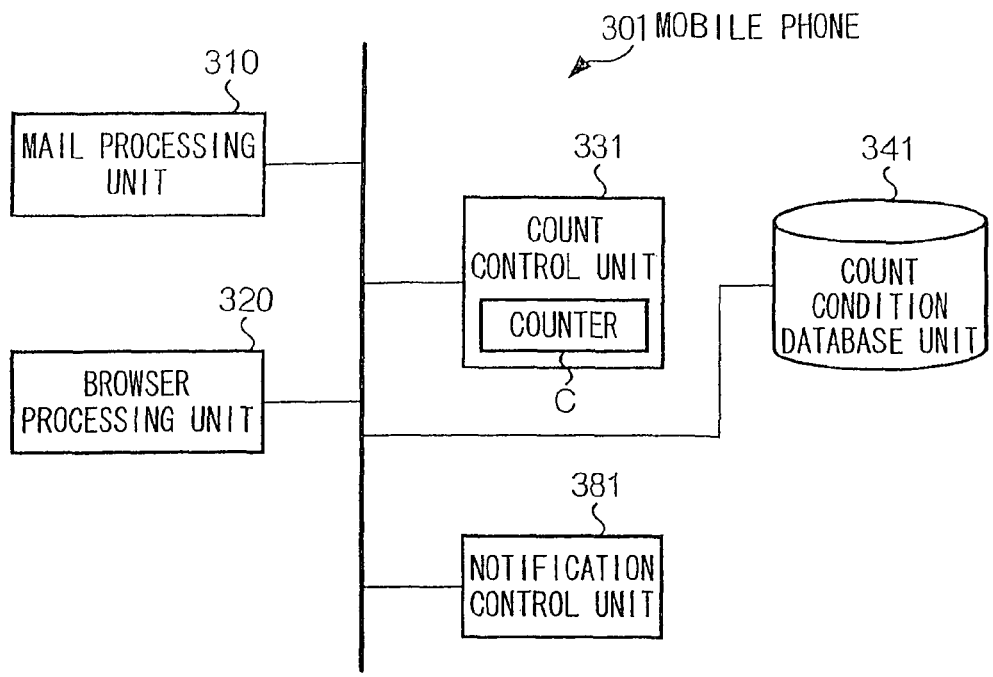
FIG. 8 is a flowchart showing the functional configuration of a mobile phone according to modification example 2 of the second embodiment.

FIG. 8 is a flowchart showing the functional configuration of mobile phone 301 according to modification example 2. In FIG. 8, processes corresponding to FIG. 2 denote the same reference numerals and a detailed explanation will be omitted. In FIG. 8, processes corresponding to FIG. 2 denote the same reference numerals and a detailed explanation will be omitted.

Counting control unit 331 follows the count conditions registered with count condition database unit 341 and accordingly counts the number of times data communication is performed with an external terminal. Count condition database unit (storage means) 341 is registered with conditions for counting the number of times the above described data communication (counting condition) is performed. A counting condition includes a specific keyword as illustrated in FIG. 3. Conditions other than a specific keyword may also be set as counting conditions.

Counting control unit 331 refers to a specific keyword registered with count condition database unit 341 and determines whether the data sent and received between external terminals, or designated URL contain the specific keyword (namely, whether the data or URL satisfies a counting condition). When it is determined that the data communication satisfies a counting condition, counting control unit 331 increases the counting value of counter C. In this way, counting control unit 331 counts the number of times data communication is performed and if the number satisfies a counting condition, provides the counting result to notification control unit 381. When the counting result is received from counting control unit 331, notification control unit 381 compares the counting result with a predetermined threshold value (for example, 10 times). As a result of the comparison it is detected that the counting value has reached a predetermined threshold value, notification control unit 381 (notifying means) notifies the counted number to a predetermined communication destination (such as communication management server 700). In the above modification, the threshold and the communication destination are set in advance at the time of shipment of mobile phone 301; the threshold and the destination may also be set and changed in accordance with instructions from external devices. The above configuration allows a user to identify promptly and accurately the number of times a predetermined Internet site (such as "dating service site") is accessed.

B. Second Embodiment

Figure 9:
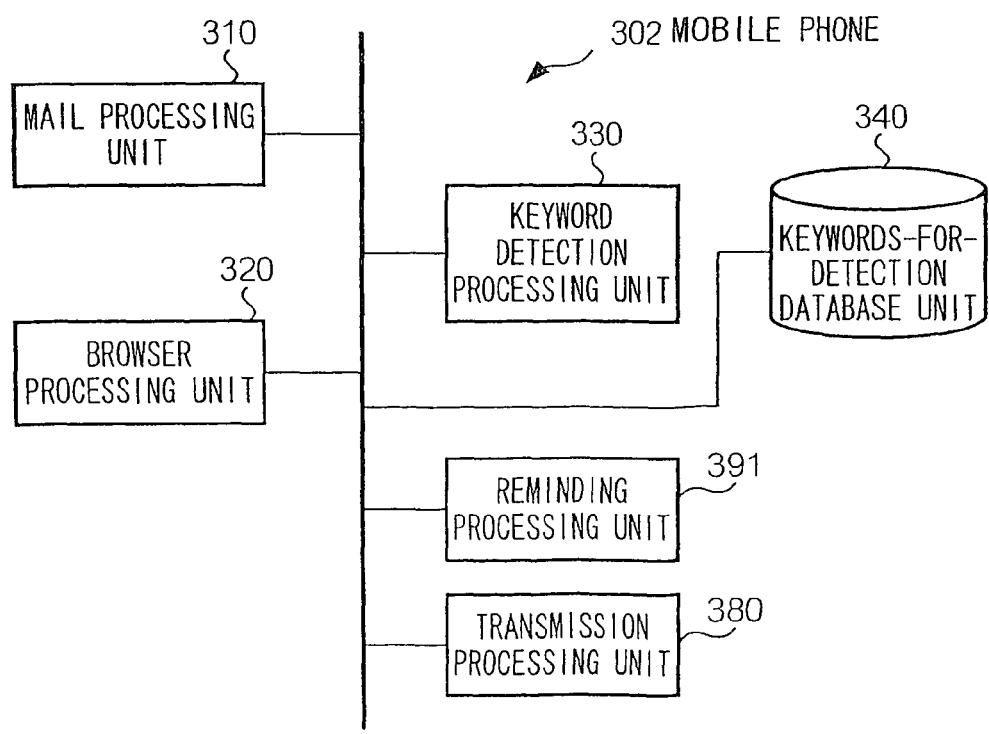
FIG. 9 is a flowchart showing the functional configuration of a mobile phone of the second embodiment.

FIG. 9 is a flowchart showing the functional configuration of mobile phone 302 of the second embodiment. In FIG. 9, processes corresponding to FIG. 2 denote the same reference numerals and a detailed explanation of it will be omitted.

Mobile phone 302 of the second embodiment provides the function for transmitting received unwanted data (such as unwanted e-mail; hereinafter, unwanted e-mail being the data) to a predetermined transmission destination.

Figure 10:
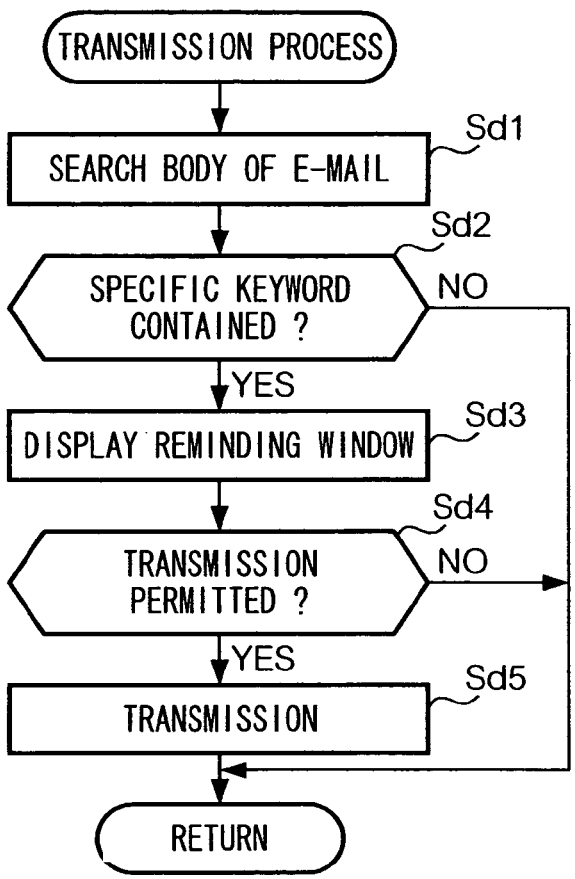
FIG. 10 is a flowchart showing the transmission processes of the second embodiment.

Reminding processing unit (reminding means) 391 urges a user to determine whether to permit the transmission of received e-mails. FIG. 10 is a flowchart showing the transmission processes of received e-mails performed by mobile phone 302.

When receiving the received e-mail from mail processing unit 310, keyword detection processing unit (determining means) 330 refers to keywords-for-detection database unit 340 and determines whether a specific keyword is included in the e-mail (from step Sd1 to step Sd2). In a case it is determined that an e-mail contains a specific keyword, keyword detection processing unit 330 ends the processes; in a case it is determined that an email does not contain a specific keyword (step Sd2; Yes), keyword detection processing unit 330 notifies mail processing unit 310 of a determination result that the email contains a specific keyword. When receiving the notification, as shown in FIG. 11, reminding processing unit 391 displays on a display unit a reminding window urging a user to instruct whether to permit the transmission of the received e-mail (step Sd3).

Figure 11:
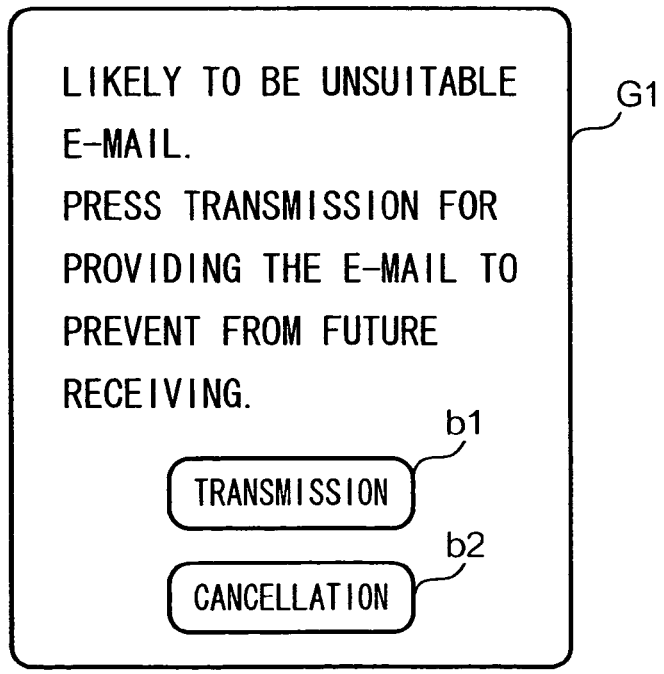
FIG. 11 is a diagram illustrating a reminding window of the second embodiment.

As shown in FIG. 11, transmission button b1 for permitting the transmission of received e-mail and a cancellation button b2 for canceling the transmission of received e-mail are displayed on reminding window G1. A user touches transmission button b1 displayed on reminding window G to permit the transmission of received e-mail. In response to the operation (step Sd4; Yes), reminding processing unit 391 sends to transmission processing unit 380 an instruction to transmit the received e-mail. Transmission processing unit 380 is set with the transmission destination of the received e-mail (in the present embodiment, the destination is communication management server 700). When receiving a transmission instruction from reminding processing unit 391, transmission processing unit 380 transmits the received e-mail to the predetermined transmission destination (step Sd5) and terminates the processes. A user may operate mobile phone 300 to suitably change the transmission destination of the received e-mail; in a preferred embodiment, a server (not shown) may also set and change the destination.

As explained, the above configuration enables a user to transmit a received e-mail to communication management server 700, by a simple operation such as touching a transmission button b1 displayed on reminding window G1. Consequently, the time required for transmitting the received e-mail to communication management server 700 (namely, inputting a URL of communication management server 700) is reduced, and the transmission of received e-mail is more assured. Furthermore, a user who does not know that the received e-mail can be transmitted to communication management server 700 is given another attempt at transmission.

C. Third Embodiment

Figure 12:
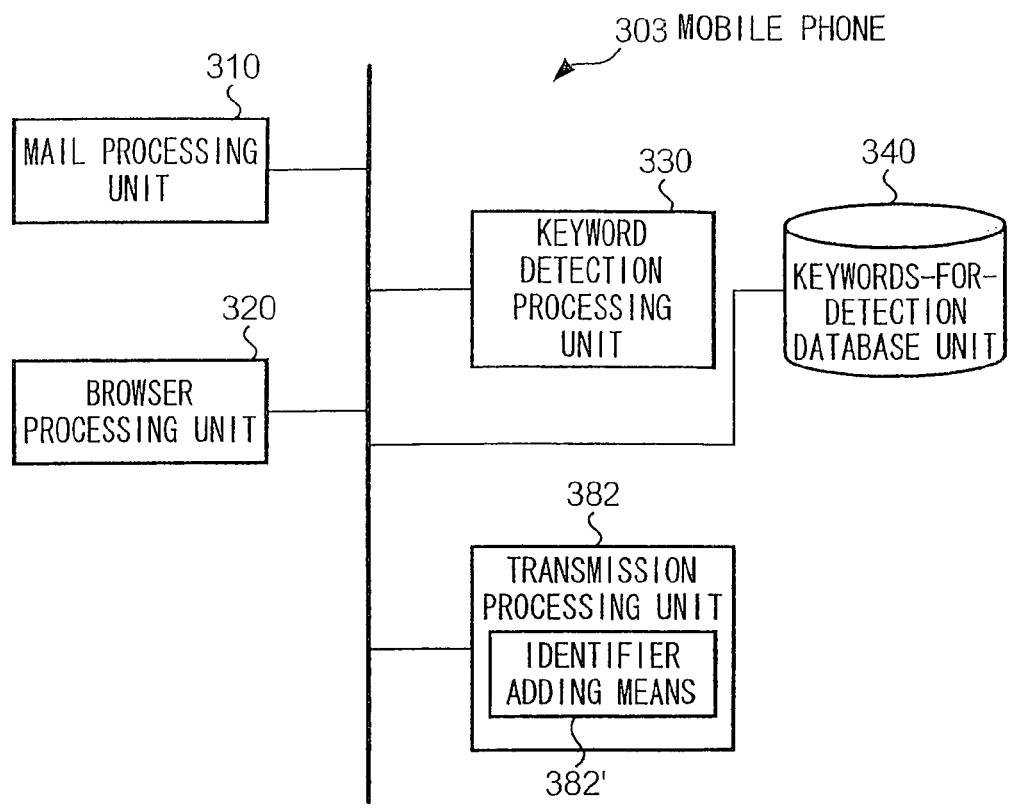
FIG. 12 is a diagram showing the functional configuration of a mobile phone of the third embodiment.

FIG. 12 is a diagram showing the functional configuration of mobile phone 303 of the third embodiment. In FIG. 12, processes corresponding to FIG. 2 denote the same reference numerals and a detailed explanation will be omitted.

Figure 13:
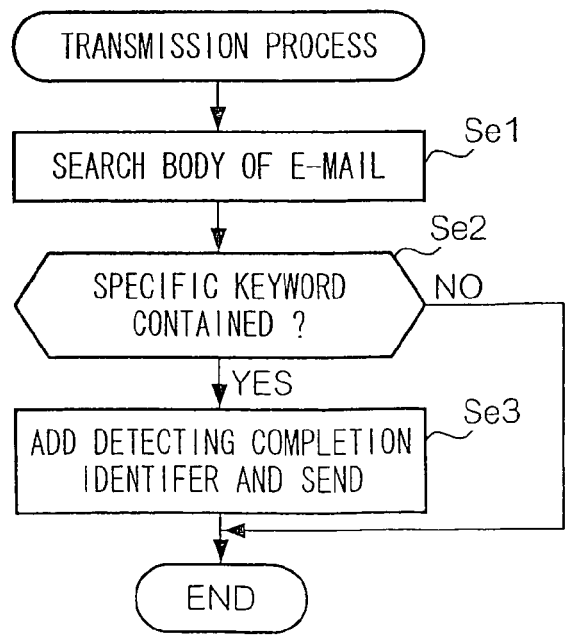
FIG. 13 is a flowchart showing the transmission processes of the third embodiment.
Figure 14:
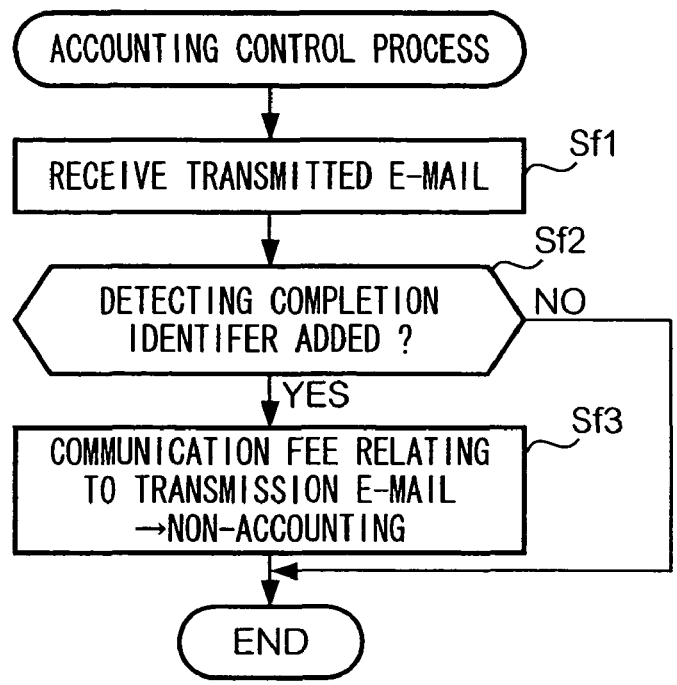
FIG. 14 is a flowchart showing the accounting control processes of the third embodiment.

Transmission processing unit (transmission means) 382 shown in FIG. 12 is equipped with identifier adding means 382 for adding an identifier indicating that a received e-mail contains a specific keyword (detected identifier), when the e-mail to be transmitted contains a specific keyword. The detected identifier is an identifier used for not charging communication fees (no charge), and the communication fees for transmitting the received e-mail to a predetermined transmission destination (such as communication management server 700) is not charged. FIG. 13 is a flowchart showing the transmission processes of a received e-mail performed by mobile phone 303. FIG. 14 is a flowchart showing the accounting control processes performed by communication management server 700.

When receiving a received e-mail from mail processing unit 310, keyword detection processing unit (determining means) 330 refers to keywords-for-detection database unit 340 and determines whether the e-mail contains a specific keyword (from step Se1 to step Se2). In the case it is determined that a received e-mail contains a specific keyword, keyword detection processing unit 330 ends the processes; in the case it is determined that a received e-mail contains a specific keyword (step Se2; Yes), keyword detection processing unit 330 sends a transmission instruction for transmitting the received e-mail to transmission processing unit 380.

When receiving the transmission instruction, transmission processing unit 380 adds detected identifier to the received e-mail and transmits the received e-mail to a predetermined transmission destination and ends the processes. A user may operate mobile phone 300 to suitably change the transmission destination of a received e-mail; in a preferred embodiment, a server (not shown) may also set and change the destination.

When receiving a received e-mail (in the present embodiment, referred to as a transmission e-mail) from mobile phone 300, communication management server (accounting control device) 700 determines whether a detected identifier is added to the transmission e-mail (from step Sf1 to step Sf2). In the case it is determined that a detected identifier is added to the transmission e-mail, communication management server 700 does not charge communication fees relating to the transmission e-mail (step Sf3) and ends the processes. It should be noted that the method of handling the transmission e-mail having no detected identifier can be changed according to the design of communication management server 700. More specifically, in one embodiment, all of the e-mails to be transmitted having no detected identifier may be considered as objects to be charged a communication fee. In a preferred embodiment, management server 700 may determine whether the e-mail to be transmitted having no detected identifier is considered an unwanted e-mail; in a case that the e-mail is determined to be an unwanted e-mail, the mail may not be considered as an object to be charged a communication fee; and in a case that the e-mail is not determined to be an unwanted e-mail, the mail may be considered as an object to be charged a communication fee.

Figure 15:
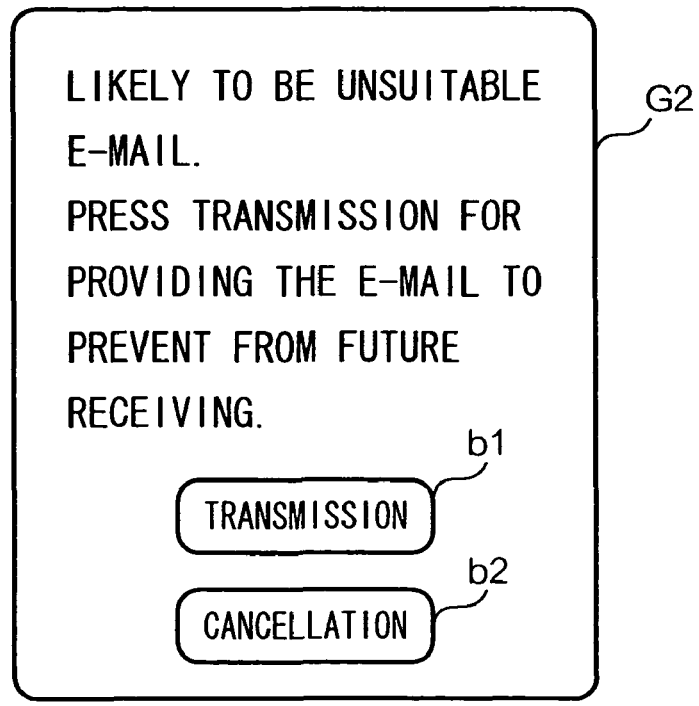
FIG. 15 is a diagram illustrating a reminding window of the third embodiment.

Furthermore, by the combination of the configuration of the second embodiment and the configuration of the third embodiment, reminding window G2 as shown in FIG. 15 may also be displayed on a display device. As is obvious from the comparison between FIG. 15 and FIG. 11, reminding window G2 and reminding window G1 differ in whether the discharge in the communication fees is displayed. While reminding window G2 is being displayed and a transmission button b1 is touched by a user, transmission processing unit 382 adds a detected identifier to a received e-mail and sends the e-mail to a communication destination (in the present embodiment, the destination is communication management server 700). Other operations are the same as described above; thus, an explanation will be omitted.

D. Fourth Embodiment

Figure 16:
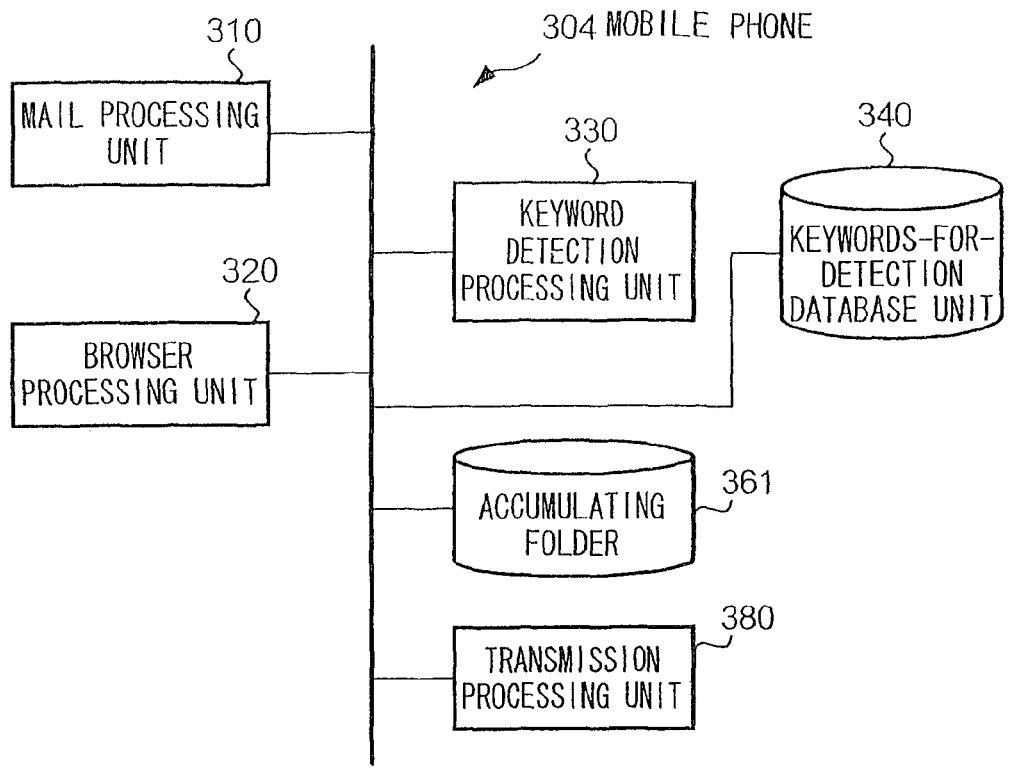
FIG. 16 is a diagram showing the functional configuration of a mobile phone of the fourth embodiment.

FIG. 16 is a diagram showing the functional configuration of mobile phone 304 of the fourth embodiment. In FIG. 16, processes corresponding to FIG. 2 are denoted by the same reference numerals and a detailed explanation will be omitted.

Figure 18:
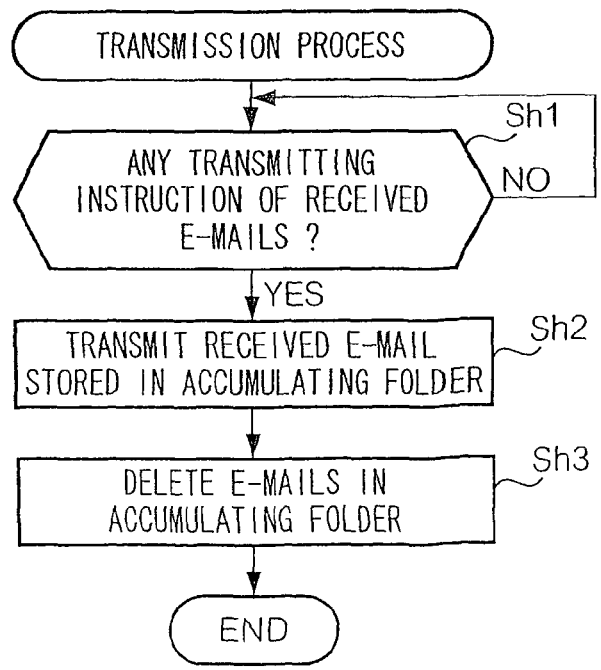
FIG. 18 is a flowchart showing the transmission processes of the fourth embodiment.
Figure 17:
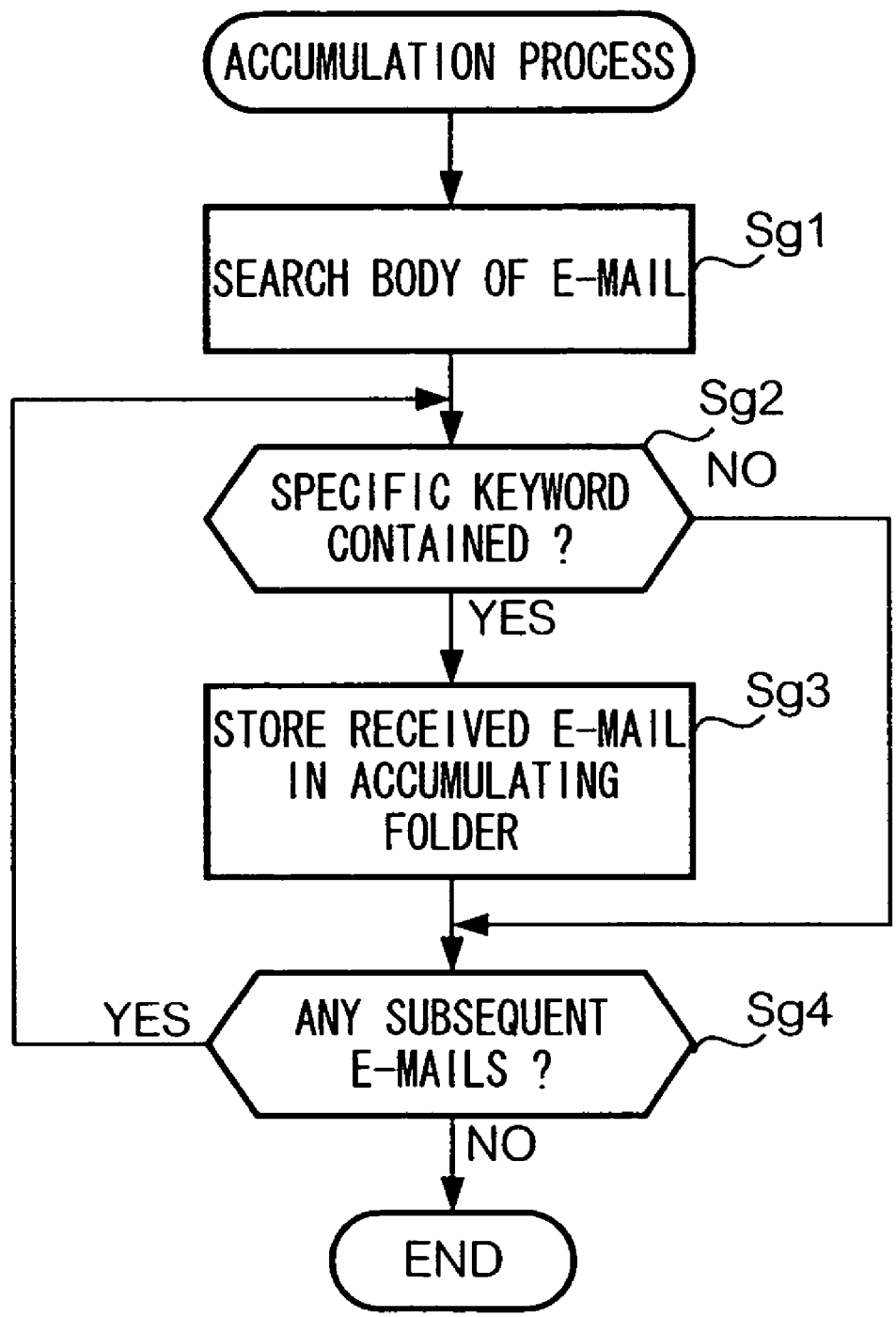
FIG. 17 is a flowchart showing the accumulating processes of the fourth embodiment.

Accumulating folder 361 is a folder for accumulating either a body of received e-mails containing a specific keyword or a part of the e-mail (such as a clause containing a specific keyword or a source address). FIGS. 17 and 18 are flowcharts illustrating the accumulating processes and the transmission processes, respectively.

When receiving a received e-mail from mail processing unit 310, keyword detection processing unit (determining means) 330 refers to keywords-for-detection database unit 340 and determines whether a received e-mail contains a specific keyword (from step Sg1 to step Sg2). In the case it is determined that a received e-mail does not contain a specific keyword, keyword detection processing unit 330 ends the processes; in the case it is determined that a received e-mail contains a specific keyword (step Sg2; Yes), keyword detection processing unit 330 notifies mail processing unit 310 that the body (or a part) of the received e-mail containing a specific keyword in accumulating folder 361 (step Sg3). When receiving the notification from keyword detection processing unit 330, mail processing unit 310 determines whether there are subsequent e-mails to be searched (step Sg4). In a case it is determined that subsequent e-mails to be searched exist, mail processing unit 310 returns to step Sg2 and repeatedly performs the above process; in a case it is determined that the subsequent e-mails to be searched do not exist, mail processing unit 310 ends the above explained processes.

When receiving, as a result of a touch operation of buttons by a user, a transmission instruction of the received e-mail stored in accumulating folder 361 (step Sh1), transmission processing unit 380 reads out the received e-mail stored in accumulating folder 361 and transmits the e-mail to a predetermined transmission destination (in the present embodiment, the destination is communication management server 700) (step Sh2). As a result of completing the transmission of a received e-mail, transmission processing unit 380 deletes the e-mail stored in accumulating folder 361 (step Sh3) and ends the above explained processes. In the above example, an embodiment is illustrated in which a received e-mail stored in accumulating folder 361 is deleted in step Sh3; in a preferred embodiment, however, whether to delete a received e-mail stored in accumulating folder 361 or the timing for deleting the received e-mail can be arbitrarily set and is changeable.

E. Others

In each embodiment and modification example explained above, an e-mail or content of an e-mail are illustrated as data sent and received by mobile phone 300; however, any type of data including Java (trademark) program, IM (Instant Messenger), and SMS (Short Message Service) can be sent/received. Data sent/received between mobile phone 300 and external terminals is not limited to character data; the data also includes voice data or image data.

Since the various functions of mobile phone 300 of the present embodiment explained above and each of the modification examples are realized by a program stored in ROM, the program may be registered with a storage medium such as a CD-ROM or may be distributed via a communication network.

The invention claimed is:
1. A mobile communication terminal, comprising;
a memory configured to include a condition memory and a log data memory;
the condition memory configured to store a keyword to trigger generation of a log data record;
the log data memory configured to store the log data record;

a controller operably coupled with the memory, the controller configured to detect the keyword in a body of a message, wherein the message includes a header and the body, and in response to detection of the keyword in the body of the message, the controller further configured to generate and store the log data record in the log data memory, wherein the log data record is configured to include the at least a part of each message that contains the keyword in the body of the message, wherein the message is from the mobile communication terminal to a destination network address or the message is to the mobile communication terminal from a transmission network address;

the controller further configured to generate an identifier indicative of detection of the keyword in the message, and further indicative that a fee for a transmission including the identifier is not chargeable to an account associated with the mobile communication terminal; and a communication device operably coupled with the controller, the controller further operable, in response to satisfaction of a predetermined condition, to direct the communication device to transmit at least a portion of the log data record and the identifier over a communication network for receipt by a predetermined node designated by a communication network management system related to the communication network.

2. The mobile communication terminal according to claim 1, wherein:
the log data record includes the keyword.

3. The mobile communication terminal according to claim 1, wherein the controller is further configured to track a volume of log data stored in the log data memory, and the predetermined condition is a determined threshold level of the stored volume of log data.

4. The mobile communication terminal of claim 1, further comprising:
a user interface operably coupled to the controller, and
the controller is further configured to generate an indication on the user interface that the message includes the keyword stored in the condition memory.

5. The mobile communication terminal of claim 4, wherein the user interface is configured to display a prompt that is selectable by a user of the mobile communication terminal to trigger transmittal over the communication network of the at least a portion of the log data record for receipt by the predetermined node.

6. The mobile communication terminal of claim 1, wherein the keyword is selected from a keyword group consisting of, a phrase, a clause, a symbolic phrase, and an address.

7. The mobile communication terminal of claim 1, wherein the communication network includes a mobile communication network;
wherein the mobile communication terminal connects to the communication network through the mobile communication network; and
wherein the predetermined device is a communication management server within the mobile communication network.

8. A method for screening messages sent through a mobile communication system, the method comprising:
a mobile terminal determining whether data communicated in a communication with the mobile terminal over a communication network satisfies a condition to trigger generation of a log data record, the data communicated in the communication including a message having a header and a body, and the condition being detection of a keyword in the body of the message;
in response to determination that the data satisfies the condition to trigger generation of the log data record, the mobile terminal generating the log data record and an identifier indicative of detection of the keyword in the message and that a communication fee is not chargeable to an account associated with the mobile terminal for a transmission over the communication network that includes the identifier;
in response to generation of the log data record, the mobile terminal storing the log data record in a memory of the mobile terminal, wherein the stored log data record includes at least a portion of the data that satisfied the condition to trigger generation of the log data record; and
in response to satisfaction of a predetermined condition, the mobile terminal transmitting at least a portion of the log data record and the identifier over the communication network for receipt by a predetermined node.

9. A method for screening a message including a header and a body, the method comprising:
a mobile terminal determining whether the body of the message contains a keyword stored in a condition memory of a memory of the mobile terminal;
in response to determination that the body of the message contains the keyword, the mobile terminal generating a log data record and an identifier indicative of detection of the keyword in the message;
in response to generation of the log data record, the mobile terminal storing the log data record in a log data record memory of the memory of the mobile terminal, wherein the stored log data record includes at least a portion of the message that contains the keyword;
in response to satisfaction of a predetermined condition, the mobile terminal transmitting at least a portion of the log data record and the identifier over the communication network for receipt by a predetermined node designated by a communication network management system related to the communication network, the identifier further indicative that transmission over the communication network of the portion of the log data is without charge of a communication fee to an account associated with the mobile terminal.

10. The method of claim 9, wherein the message is received by the mobile terminal, and wherein the mobile terminal determining whether the body of the message contains the keyword further comprises:
the mobile terminal determining whether the body of the message sent to the mobile terminal over the communication network contains the keyword.

11. The method of claim 9, wherein the mobile terminal determining whether the body of the message contains the keyword further comprises:
the mobile terminal determining whether the body of the message to be sent from the mobile station over the communication network contains the keyword.

12. The method of claim 9, wherein the log data record memory of the memory of the mobile terminal contains a plurality of log data records, the plurality of log data records including the log data record; and
wherein transmitting at least the portion of the log data record over the communication network for receipt by the predetermined node designated by the communication network management system further comprises:
in response to satisfaction of the predetermined condition, transmitting to the predetermined node designated by the communication network management system related to the communication network at least a portion of the plurality of log data records stored in the log data record memory.

13. The method of claim 9, wherein satisfaction of the predetermined condition further comprises:
determining that the log data record memory contains a predetermined capacity threshold.

14. The method of claim 9, wherein the log data record memory contains a plurality of log data records, the plurality of log data records including the log data record; and
wherein satisfaction of the predetermined condition includes:
determining that the plurality of log data records at least equals a predetermined threshold; and
based upon determination that the plurality of log data records at least equals the predetermined threshold, transmitting to the predetermined node designated by the communication network management system at least a portion of the plurality of log data records stored in the log data record.

15. The method of claim 9, wherein the log data record memory of the mobile terminal contains a plurality of log data records, the plurality of log data records including the log data record; and
wherein satisfaction of the predetermined condition includes:
the mobile terminal detecting receipt of a request to transmit the plurality of log data records to the predetermined node designated by the communication network management system.

16. The method of claim 15, wherein the request to transmit the plurality of log data records is received through the communication network.

\* \* \* \* \*